(12) United States Patent
Yang et al.

(10) Patent No.: US 11,106,192 B2
(45) Date of Patent: Aug. 31, 2021

(54) ADDITIVE MANUFACTURING PROCESS PLAN OPTIMIZATION BASED ON PREDICTED TEMPERATURE VARIATION

(71) Applicant: GENERAL ELECTRIC COMPANY, Schenectady, NY (US)

(72) Inventors: Yong Yang, Shanghai (CN); Yibo Gao, Shanghai (CN)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 16/109,885

(22) Filed: Aug. 23, 2018

(65) Prior Publication Data

US 2019/0079493 A1 Mar. 14, 2019

(30) Foreign Application Priority Data

Sep. 14, 2017 (CN) .......................... 201710826622.3

(51) Int. Cl.
*G05B 19/4093* (2006.01)

(52) U.S. Cl.
CPC .................. *G05B 19/40937* (2013.01); *G05B 2219/40113* (2013.01); *G05B 2219/42155* (2013.01)

(58) Field of Classification Search
CPC .... G05B 19/40947; G05B 2219/40113; G05B 2219/42155
USPC .......................................................... 700/97
See application file for complete search history.

(56) References Cited

U.S. PATENT DOCUMENTS

| 6,580,959 B1 | 6/2003 | Mazumder |
| 8,383,985 B2 | 2/2013 | Twelves, Jr. et al. |
| 9,522,426 B2 | 12/2016 | Das et al. |
| 9,573,224 B2 * | 2/2017 | Sparks ................... B33Y 30/00 |
| 2013/0343947 A1 | 12/2013 | Satzger et al. |
| 2014/0371900 A1 * | 12/2014 | Lee ........................ B23P 25/006 |
| | | 700/173 |

(Continued)

FOREIGN PATENT DOCUMENTS

| CN | 106295995 A | 1/2017 |
| WO | WO2016/081651 A1 | 5/2016 |

(Continued)

OTHER PUBLICATIONS

Mani et al., Measurement Science Needs for Real-time Control of Additive Manufacturing Powder Bed Fusion Processes, National Institute of Standards and Technology (NISTIR 8036), Mar. 15, 2015, pp. 46.

(Continued)

*Primary Examiner* — Kenneth M Lo
*Assistant Examiner* — Michael W Choi
(74) *Attorney, Agent, or Firm* — Dority & Manning, P.A.

(57) ABSTRACT

A process plan optimization method for manufacturing a workpiece by adding a material in a plurality of layers is provided. The method includes: building a predicting model, the predicting model configured to predict a temperature variation of at least a portion of the workpiece; predicting an expected temperature variation of the portion of the workpiece to be manufactured during a given time period based on the predicting model and the process plan; and adjusting the process plan in response to the expected temperature variation of the portion failing to meet a preset condition, to make the expected temperature variation of the portion meet the preset condition.

13 Claims, 4 Drawing Sheets

(56) References Cited

U.S. PATENT DOCUMENTS

| | | | |
|---|---|---|---|
| 2015/0165681 A1 | 6/2015 | Fish et al. | |
| 2015/0266237 A1* | 9/2015 | Comb | G03G 15/224 |
| | | | 264/401 |
| 2016/0059352 A1 | 3/2016 | Sparks | |
| 2016/0180994 A1 | 6/2016 | Kuo et al. | |
| 2016/0185048 A1 | 6/2016 | Dave et al. | |
| 2016/0199911 A1 | 7/2016 | Dave et al. | |
| 2016/0236414 A1 | 8/2016 | Reese et al. | |
| 2017/0090462 A1* | 3/2017 | Dave | G01N 21/00 |
| 2017/0239719 A1* | 8/2017 | Buller | B33Y 40/00 |
| 2018/0141123 A1* | 5/2018 | Revanur | B33Y 50/00 |
| 2018/0275636 A1* | 9/2018 | Zhao | G05B 19/4099 |
| 2018/0311757 A1* | 11/2018 | Bucknell | B22F 3/1055 |

FOREIGN PATENT DOCUMENTS

| | | |
|---|---|---|
| WO | WO2016/193742 A1 | 12/2016 |
| WO | WO2017/131613 A1 | 8/2017 |

OTHER PUBLICATIONS

Marshall et al., Data Indicating Temperature Response of Ti—6Al—4V Thin-walled Structure during its Additive Manufacture via Laser Engineered Net Shaping, Data in Brief, vol. 7, Jun. 2016, pp. 697-703.

Chinese Search Report and Office Action Corresponding to Application No. 201710826622 dated May 13, 2020.

Combined Chinese Search Report and Office Action Corresponding to Application No. 201710826622 dated Dec. 28, 2020.

* cited by examiner

ADDITIVE MANUFACTURING PROCESS PLAN OPTIMIZATION BASED ON PREDICTED TEMPERATURE VARIATION

TECHNICAL FIELD

Embodiments of the present invention relate to an additive manufacturing process plan optimization method and optimizer, and an additive manufacturing method.

TECHNICAL BACKGROUND

In an additive manufacturing and machining process, temperature control on a workpiece is one of the most important sections. If a workpiece is overheated in a manufacturing process, the workpiece may consequently have problems such as cracking, deformation, and an uneven crystal structure. Even, in some severer cases, overheating of the workpiece may cause a whole manufacturing process to be forced to stop.

In the prior art, a process plan is usually made only based on a geometrical parameter of a workpiece. If such a process plan is carried out, it is likely to result in a phenomenon that a specific portion of the workpiece is overheated in a manufacturing process, and it is difficult to effectively control a temperature of the workpiece.

In addition, in the prior art, once a process plan is completely made, in an additive manufacturing process, it is impossible to change and adjust the process plan timely. Consequently, it is difficult to improve a yield rate of the manufacturing.

Therefore, it is necessary to provide a novel additive manufacturing process plan optimization method and optimizer, and a novel additive manufacturing method, to resolve at least one of the foregoing problems.

SUMMARY OF THE INVENTION

An aspect of embodiments of the present invention relates to a method for optimizing a process plan for manufacturing a workpiece by adding a material in a plurality of layers. The method includes: building a predicting model, the predicting model configured to predict a temperature variation of at least a portion of the workpiece; predicting an expected temperature variation of the portion of the workpiece to be manufactured during a given time period based on the predicting model and the process plan; and adjusting the process plan in response to the expected temperature variation of the portion failing to meet a preset condition, to make the expected temperature variation of the portion meet the preset condition.

Another aspect of the embodiments of the present invention relate to an optimizer for optimizing a process plan for manufacturing a workpiece by adding a material in a plurality of layers. The optimizer includes a modeler, a predictor, and a corrector. The modeler is configured to build a predicting model, the predicting model configured to predict a temperature variation of at least a portion of the workpiece. The predictor is configured to predict an expected temperature variation of the portion of the workpiece to be manufactured during a given time period based on the predicting model and the process plan. The corrector is configured to adjust the process plan in response to the expected temperature variation of the portion failing to meet a preset condition, to make the expected temperature variation of the portion meet the preset condition.

Another aspect of embodiments of the present invention relates to an additive manufacturing method for manufacturing a workpiece. The method includes: adding a material in a plurality of layers to form the workpiece. A step of adding each layer of the workpiece during a time period includes: predicting an expected temperature variation of the layer to be manufactured during the time period, based on a process plan and a predicting model; if the expected temperature variation of the layer fails to meet a preset condition, adjusting the process plan to make the expected temperature variation meet the preset condition, and manufacturing the layer according to the adjusted process plan; and if the expected temperature variation of the layer meets the preset condition, manufacturing the layer according to the process plan.

BRIEF DESCRIPTION OF THE DRAWINGS

These and other features, aspects, and advantages of the present invention will become clearer once the following detailed description has been read with reference to the accompanying drawings, where like reference numerals refer to like parts throughout the drawings, wherein.

DETAILED DESCRIPTION OF EMBODIMENTS

The specific implementations of the present invention will be described below in detail with reference to the accompanying drawings in order to facilitate those skilled in the art to exactly understand the subject matter claimed by the present invention. In the following detailed description of these specific embodiments, the present specification does not describe in detail any of the known functions or configurations, to avoid unnecessary details that may affect the disclosure of the present invention.

Unless otherwise defined, the technical and scientific terms used in the claims and the specification are as they are usually understood by those skilled in the art to which the present invention pertains. "First", "second" and similar words used in the specification and the claims do not denote any order, quantity or importance, but are merely intended to distinguish between different constituents. The terms "one", "a" and similar words are not meant to be limiting, but rather denote the presence of at least one. "Comprising", "consisting of" and similar words mean that the elements or articles appearing before "comprising" or "consisting of" include the elements or articles and their equivalent elements appearing behind "comprising" or "consisting of", not excluding any other elements or articles. "Connected", "coupled" and similar words are not restricted to physical or mechanical connections, but may also include electrical connections, whether direct or indirect.

Figure 1:
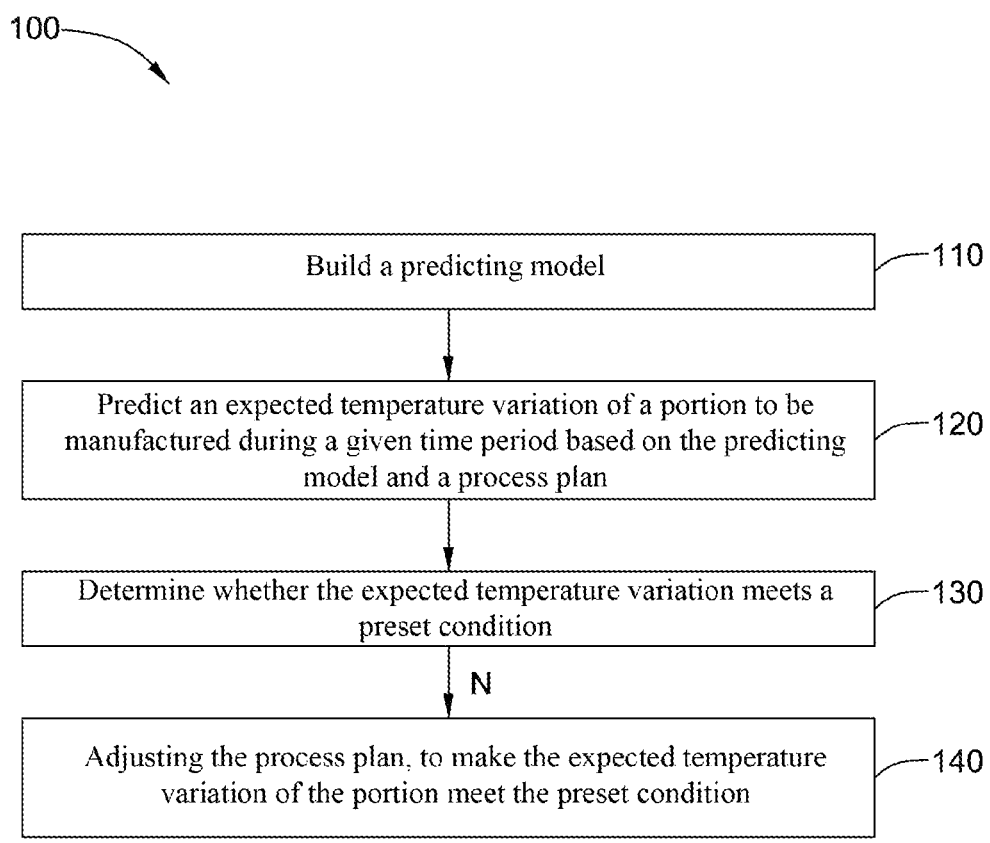
FIG. 1 is a flowchart of a method for optimizing an additive manufacturing process plan according to a specific embodiment of the present invention.
Figure 2:
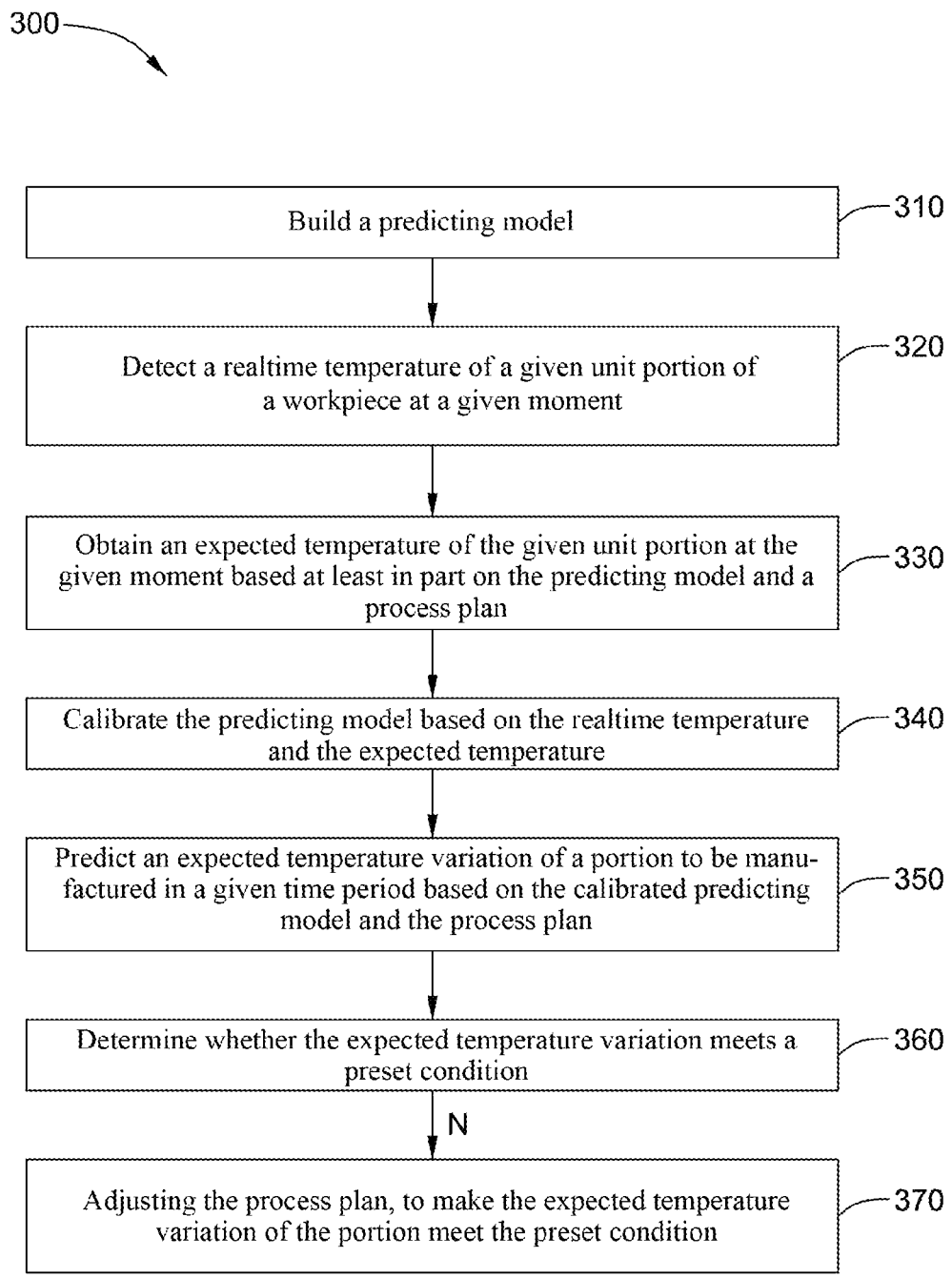
FIG. 2 is a flowchart of a method for optimizing an additive manufacturing process plan according to another specific embodiment of the present invention.
Figure 3:
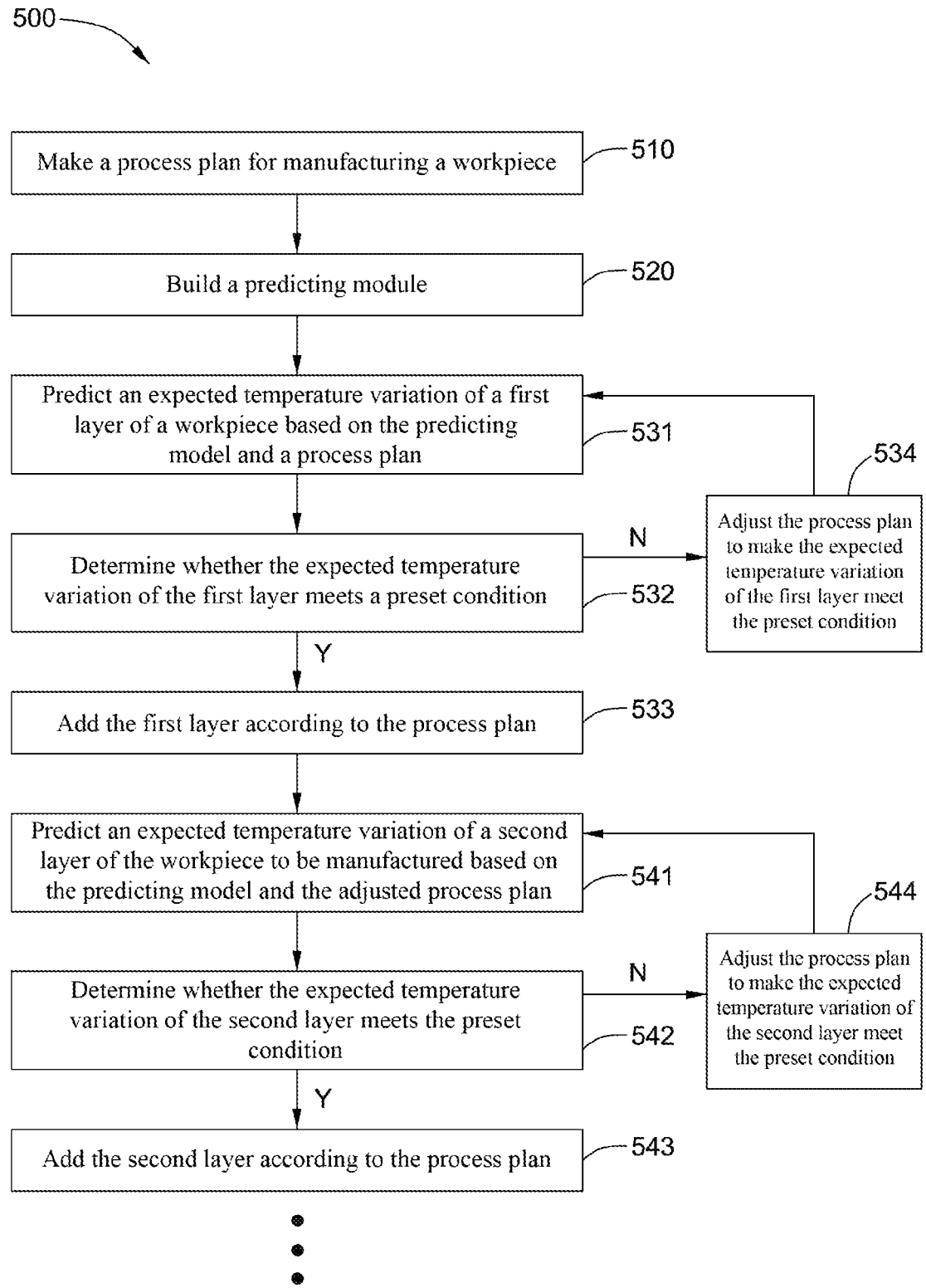
FIG. 3 is a flowchart of an additive manufacturing method according to a specific embodiment of the present invention.

The methods in the embodiments of the present invention are shown in figures as functional modules. It should be noted that a sequence of modules and division of actions in the modules shown in FIG. 1 to FIG. 3 are not limited to the embodiments of the figures. For examples, modules can be executed according to different sequences, and an action in a module may be an action combination of another module or a plurality of modules, or may be divided into a plurality of modules.

The embodiments of the present invention relate to a process plan optimization method, wildly applicable to additive manufacturing process procedures, and capable of optimizing an additive manufacturing process plan, so as to improve quality and performance of a finished product.

FIG. 1 is a flowchart of a method 100 for optimizing an additive manufacturing process plan according to a specific embodiment of the present invention. The process plan is an additive manufacturing process plan, and in the process plan, a workpiece to be manufactured is manufactured or formed by adding a material in a plurality of layers. In some embodiments, a non-optimized process plan includes power of an energy source and a scanning path of a printer head, and is made according to a geometrical parameter of a workpiece.

Referring to FIG. 1, the method 100 includes a modeling step 110, a predicting step 120, a determining step 130, and an adjusting step 140.

First, as shown in step 110, a predicting model is built, where the predicting model may be configured to predict a temperature variation of at least a portion of the workpiece. The "temperature variation" stated herein includes a variation of a temperature of a to-be-detected portion of the workpiece over a time period. In some embodiments, the predicting model can be built based on a geometrical parameter of the workpiece, a boundary condition, and a property of the material of the workpiece. The "geometrical parameter" mentioned herein includes a target size, a shape, or the like of the workpiece to be manufactured. The "boundary condition" refers to a sum of impacts, on a temperature of the workpiece, exerted by elements or substances surrounding workpiece and capable of exchanging heat with the workpiece. The "property of the material" includes a chemical property of the material, a physical property of the material, or a combination thereof, where the physical property includes a grain size of the material and the like.

In step 120, an expected temperature variation of the portion of the workpiece to be manufactured during a given time period is predicted based on the predicting model and the process plan. In some embodiments, the given time period may be approximately 5 seconds to 60 seconds. For example, the given time period is approximately 10 seconds. In some embodiments, the portion of the workpiece to be manufactured is a portion in a specific layer, a specific layer, or some layers of the workpiece. The expected temperature variation includes temperature distribution of the portion of the workpiece in every moment within the given time period.

Subsequently, as shown in step 130, the expected temperature variation of the portion is compared with a preset condition, to determine whether the expected temperature variation of the portion meets the preset condition.

If the expected temperature variation of the portion fails to meet the preset condition, step 140 is performed, that is, the process plan is adjusted to make the expected temperature variation of the portion meet the preset condition. The adjusted process plan may include a scanning path of a printer head, a scanning speed plan of the printer head, an energy input plan of an energy source, or a combination thereof. The scanning speed plan includes a scanning speed variation of the printer head over time, a scanning speed variation of the printer head over space, or a combination thereof.

In some embodiments, the workpiece includes a plurality of unit portions respectively corresponding to a plurality of voxels of a digital representation of the workpiece. The predicting step includes predicting an expected temperature variation range for each unit portion to be manufactured during the given time period; then, comparing the expected temperature variation range of each unit portion with a preset temperature range; and when the expected temperature variation range does not fall within the preset temperature range, adjusting the process plan, to make the expected temperature variation range fall within the preset temperature range. More specifically, the predicting step includes predicting a maximum temperature and a minimum temperature for each unit portion to be manufactured during the given time period, and adjusting the process plan in response to either the maximum temperature or the minimum temperature being outside of a preset temperature range. In some embodiments, the plurality of unit portions in the workpiece may correspond to a same preset temperature range. In other embodiments, the plurality of unit portions in the workpiece may respectively correspond to different preset temperature ranges.

Because it is inevitable that an error exists in a predicting model built based on a boundary condition, a geometrical parameter of the workpiece and a property of the material of the workpiece, some embodiments further include a step of calibrating the predicting model, to improve accuracy of the predicting model. Referring to FIG. 2, a method 300 includes a modeling step 310, calibrating steps 320 to 340, a predicting step 350, a determining step 360, and an adjusting step 370.

Similar to step 110, in step 310, a predicting model is built based on a geometrical parameter of a workpiece, a boundary condition, and a property of the material of a workpiece.

In step 320, a realtime temperature of a given unit portion of the workpiece is detected at a given moment as a basis for calibration. In step 330, an expected temperature of the given unit portion at the given moment is obtained based at least in part on the predicting model and the process plan that are not calibrated.

Subsequently, the predicting model is calibrated based on the detected realtime temperature of the unit portion and the calculated expected temperature of the unit portion, as shown in step 340. Specifically, the calibrating step includes calibrating at least one of a property of the material and a boundary condition of the workpiece.

Steps 350 to 370 are respectively similar to steps 120 to 140 shown in FIG. 1. Details are not described herein again.

It should be noted that the calibrating step does not need to be before the predicting step, and the calibrating step may be located at any other suitable position in the method 300.

Another aspect of this application relates to an additive manufacturing method for manufacturing a workpiece, including: adding a material in a plurality of layers to form the workpiece until the workpiece is completely manufactured, where the step of adding each layer of the workpiece during a time period includes: predicting an expected temperature variation of the layer to be manufactured during the time period, based on a process plan and a predicting model of the layer; if the expected temperature variation of the layer fails to meet a preset condition, adjusting the process plan to make the expected temperature variation meet the preset condition, and then, manufacturing the layer according to the adjusted process plan; and if the expected temperature variation of the layer meets the preset condition, manufacturing the layer according to the process plan.

Referring to FIG. 3, an additive manufacturing method 500 approximately includes a process plan making step 510, a predicting model building step 520, steps 531 to 534 of manufacturing a first layer, and steps 541 to 544 of manufacturing a second layer.

Specifically, in step 510, an initial process plan for manufacturing the workpiece is made. Generally speaking, the process plan can be made based on a designed geometrical parameter of the workpiece and/or the material for manufacturing the workpiece, and parameters of the process plan may include power of an energy source and a scanning path of a printer head. In step 520, the predicting model is built based on a geometrical parameter of the workpiece, a boundary condition, and a property of the material of the workpiece. Similar to steps 110 and 310, the predicting model can be configured to predict a temperature variation of at least one portion of the workpiece. Specifically, the temperature variation refers to a variation of temperature distribution of the portion to be predicted of the workpiece over time.

Subsequently, the material is added one layer by one layer until the workpiece completely manufactured.

Specifically, in step 531, an expected temperature variation of a first layer to be manufactured is predicted based on the process plan and the predicting model obtained in step 510 and step 520. The expected temperature variation of the first layer includes a temperature variation of the first layer of the workpiece over time within a time period when the first layer is manufactured. Subsequently, as shown in step 532, the expected temperature variation of the first layer is compared with a preset condition, to determine whether the expected temperature variation of the first layer meets the preset condition.

If the expected temperature variation of the first layer meets the preset condition, it indicates that the first layer manufactured according to the current process plan can meet requirements. Therefore, in this case, the first layer is directly added according to the initial process plan, as shown in step 533.

If the expected temperature variation of the first layer fails to meet a preset condition, step 534 is performed to adjust the process plan to make the expected temperature variation of the first layer meets the preset condition. Subsequently, step 531 is performed again, to predict the expected temperature variation of the first layer again based on the predicting model and the adjusted process plan. Then, step 532 is performed again, to determine whether the expected temperature variation meets the preset condition again, and if the expected temperature variation still fails to meet the preset condition, step 534 is performed again to adjust the process plan again. Steps 531, 532, and 534 can be performed repeatedly until the expected temperature variation of the first layer meets the preset condition, and then, the first layer is manufactured according to the optimized process plan, to ensure that the first layer would not be overheated during the manufacturing process of the first layer.

Steps 541 to 544 are steps of predicting, determining, and manufacturing a second layer of the workpiece, steps 541 to 544 are respectively similar to steps 531 to 534, and details are not described again. The second layer may be a layer adjacent to the first layer or directly added over the first layer, or may be a layer not adjacent to the first layer.

Assuming that the workpiece includes N layers, the workpiece is formed by adding a material in N layers. Similarly, the method 500 may further include steps of manufacturing a third layer, steps of manufacturing a fourth layer, . . . , and steps of manufacturing an Nth layer, where steps of manufacturing each step are similar to the foregoing steps of manufacturing the first or second layer. Before each layer is added, a temperature variation of the layer is predicted, and then, the process plan is adjusted if necessary. In view of the above, in the disclosure of the present invention, different from an existing additive manufacturing method, an additive manufacturing process plan can be adjusted and optimized flexibly in real time according to a realtime status of a process procedure, so that temperature distribution of the workpiece can be effectively in a manufacturing process, thereby avoiding a locally overheated phenomenon and helping to increase a yield rate of the manufacturing and improve quality of a finished product.

This application further relates to a process plan optimizer for optimizing an additive manufacturing process plan.

Figure 4:
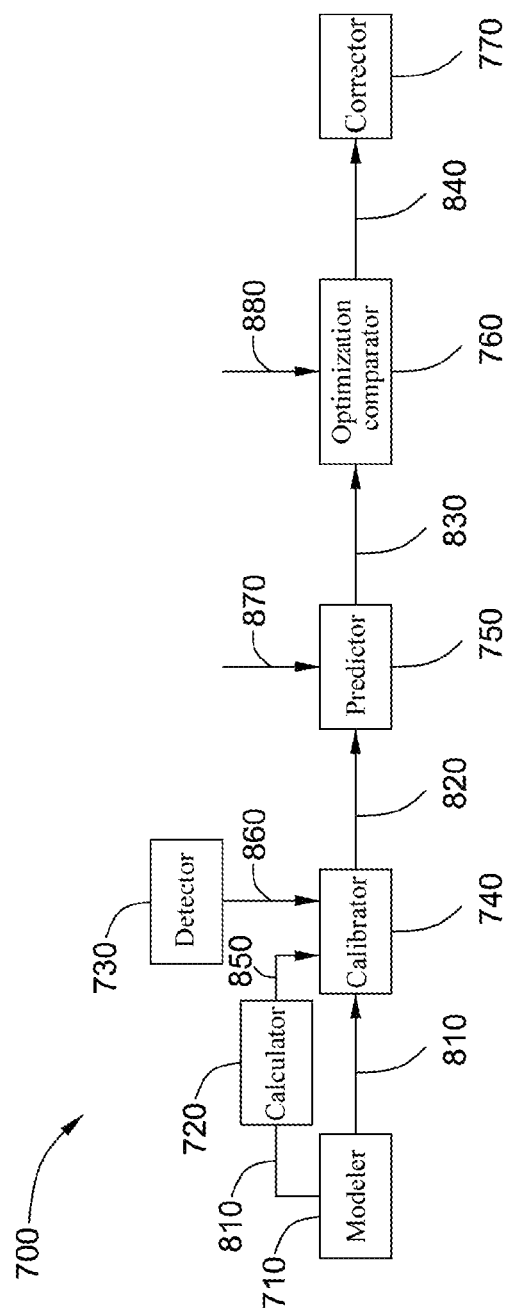
FIG. 4 is a schematic diagram of an optimizer for optimizing additive manufacturing process plan according to a specific embodiment of the present invention.

FIG. 4 is a schematic diagram of an additive manufacturing process plan optimizer 700 according to a specific embodiment of this disclosure. Referring to FIG. 4, the optimizer 700 includes a modeler 710, a predictor 750, an optimization comparator 760, and a corrector 770.

The modeler 710 is configured to build a predicting model 810, the predicting model 810 configured to predict a temperature variation of at least a portion of the workpiece.

The predictor 750 is configured to predict an expected temperature variation 830 of the portion of the workpiece to be manufactured during a given time period based on the predicting model 810 and the process plan 870.

The optimization comparator 760 is configured to compare the expected temperature variation of the portion 830 with a preset condition 880, to determine whether the expected temperature variation of the portion 830 meets preset condition 880.

The corrector 770 is configured to adjust the process plan in response to the expected temperature variation of the portion failing to meet a preset condition, to make the expected temperature variation of the portion meet the preset condition. Specifically, in some embodiments, when the optimization comparator 760 determines that the expected temperature variation 830 fails to meet the preset condition 880, a correction signal 840 is sent to the corrector 770, and after receiving the correction signal 840, the corrector 770 adjusts the process plan.

In some embodiments, the optimizer 700 further includes a calibration apparatus configured to calibrate the predicting model. The calibration apparatus includes a calculator 720, a detector 730, and a calibrator 740. The calculator 720 is configured to obtain an expected temperature 850 of the given unit portion at the given moment based at least in part on the predicting model 810 and the process plan, where the unit portion corresponds to a voxel in a digital representation of the workpiece. The detector 730 is configured to detect a realtime temperature 860 of the given unit portion of the workpiece at a given moment. In some embodiments, the detector 730 is provided on a platform for carrying the workpiece and vertical walls surrounding the workpiece, and the detector may include a contact detector, a non-contact detector, or a combination thereof. The calibrator 740 is configured to calibrate the predicting model 810 based on the realtime temperature 860 and the expected temperature 850, to obtain a calibrated predicting model 820. Subsequently, the predictor 750 predicts the expected temperature variation 830 of the portion of the workpiece to be manufacture during a given time period based on the calibrated predicting model 820 and the process plan 870.

In some embodiments, the calibration apparatus further includes a calibration comparator (not shown), configured to compare the realtime temperature 860 with the expected temperature 850, to obtain a difference therebetween, and the calibrator 740 calibrates the predicting model 810 based on the difference.

While the present invention has been described in detail with reference to specific embodiments thereof, it will be understood by those skilled in the art that many modifications and variations can be made in the present invention. It is, therefore, to be understood that the appended claims are intended to cover all such modifications and variations insofar as they are within the true spirit and scope of the invention.

What we claim is:

1. A method for optimizing a process plan for manufacturing a workpiece by adding a material in a plurality of layers, the method comprising:
    building a predicting model, the predicting model configured to predict a temperature variation of at least a portion of the workpiece;
    predicting an expected temperature variation of the portion of the workpiece to be manufactured during a given time period based on the predicting model and the process plan;
    adjusting the process plan in response to the expected temperature variation of the portion failing to meet a preset condition, to make the expected temperature variation of the portion meet the preset condition;
    detecting a realtime temperature of at least one unit portion of the workpiece at a given moment, wherein the workpiece comprises a plurality of unit portions respectively corresponding to a plurality of voxels of a digital representation of the workpiece;
    obtaining an expected temperature of the at least one unit portion at the given moment based at least in part on the predicting model and the process plan; and
    calibrating the predicting model based on the realtime temperature and the expected temperature.

2. The method according to claim 1,
    wherein the workpiece comprises a plurality of unit portions respectively corresponding to a plurality of voxels of a digital representation of the workpiece,
    wherein predicting the expected temperature variation of the portion further comprises predicting a maximum temperature and a minimum temperature for each unit portion to be manufactured during the given time period, and
    wherein the adjusting of the process plan further comprises adjusting the process plan in response to either the maximum temperature or the minimum temperature being outside of a preset temperature range.

3. The method according to claim 1, wherein building the predicting model further comprises building the predicting model based on a boundary condition, a geometrical parameter of the workpiece and a property of the material of the workpiece.

4. The method according to claim 1, wherein calibrating the predicting model further comprises calibrating at least one of a property of the material and a boundary condition of the workpiece.

5. The method according to claim 1, wherein the process plan comprises a scanning path of a printer head, a scanning speed plan of the printer head, an energy input plan of an energy source, or a combination thereof.

6. The method according to claim 5, wherein the scanning speed plan comprises a scanning speed variation of the printer head over time, a scanning speed variation of the printer head over space, or a combination thereof.

7. The method according to claim 5, wherein the energy input plan comprises a power variation of the energy source over time, a power variation of the energy source over space, or a combination thereof.

8. An additive manufacturing method for manufacturing a workpiece, comprising:
    adding a material in a plurality of layers to form the workpiece;
    wherein adding each layer of the workpiece during a time period comprises:
        predicting an expected temperature variation of the layer to be manufactured during the time period, based on a process plan and a predicting model;
        if the expected temperature variation of the layer fails to meet a preset condition, adjusting the process plan to make the expected temperature variation meet the preset condition, and manufacturing the layer according to the adjusted process plan;
        if the expected temperature variation of the layer meets the preset condition, manufacturing the layer according to the process plan;
        detecting a realtime temperature of at least one unit portion of the workpiece at a given moment, wherein the workpiece comprises a plurality of unit portions respectively corresponding to a plurality of voxels of a digital representation of the workpiece;
        obtaining an expected temperature of the at least one unit portion at the given moment based at least in part on the predicting model and the process plan; and
        calibrating the predicting model based on the realtime temperature and the expected temperature.

9. The method according to claim 8,
    wherein the workpiece comprises a plurality of unit portions respectively corresponding to a plurality of voxels of a digital representation of the workpiece,
    wherein predicting the expected temperature variation of the layer further comprises predicting a maximum temperature and a minimum temperature for each unit portion in the layer during the given time period, and
    wherein the adjusting of the process plan further comprises adjusting the process plan in response to either the maximum temperature or the minimum temperature being outside of a preset temperature range.

10. The method according to claim 8, further comprising building the predicting model based on a boundary condition, a geometrical parameter of the workpiece and a property of the material of the workpiece.

11. The method according to claim 8, further comprising making the process plan before adding the material, the process plan comprising a scanning path of a printer head, a scanning speed plan of the printer head, an energy input plan of an energy source, or a combination thereof.

12. The method according to claim 11, wherein the scanning speed plan comprises a scanning speed variation of the printer head over time, a scanning speed variation of the printer head over space, or a combination thereof.

13. The method according to claim 11, wherein the energy input plan comprises a power variation of the energy source over time, a power variation of the energy source over space, or a combination thereof.

* * * * *